Dec. 26, 1922.
P. O. NOBLE.
ELECTRIC ARC WELDING.
FILED DEC. 20, 1920.
1,439,972
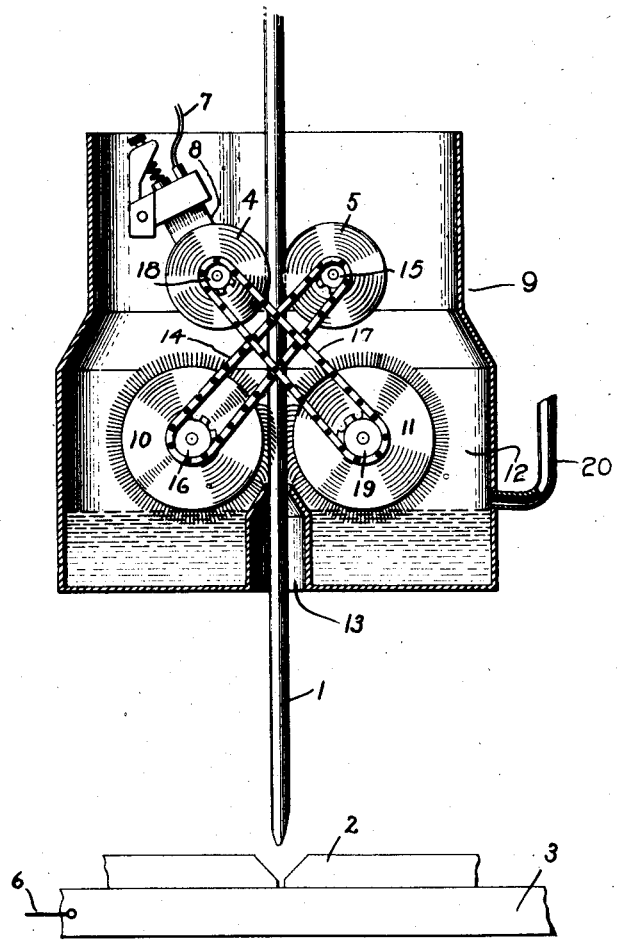
Inventor:
Paul O. Noble,
by Albert G. Davis
His Attorney.

Patented Dec. 26, 1922.

1,439,972

UNITED STATES PATENT OFFICE.

PAUL O. NOBLE, OF SCHENECTADY, NEW YORK, ASSIGNOR TO GENERAL ELECTRIC COMPANY, A CORPORATION OF NEW YORK.

ELECTRIC ARC WELDING.

Application filed December 20, 1920. Serial No. 431,879.

*To all whom it may concern:*

Be it known that I, PAUL O. NOBLE, a citizen of the United States, residing at Schenectady, in the county of Schenectady, State of New York, have invented certain new and useful Improvements in Electric Arc Welding, of which the following is a specification.

My invention relates to electric arc welding machines and more particularly to improvements in such machines which shall enable them to be used where the presence of an arc sustaining material or a welding flux is desired.

In arc welding the use of arc sustaining materials or welding fluxes is, in certain cases, desirable. This is particularly the case in connection with alternating current welding where an arc sustaining material enables the voltage of the welding circuit to be materially reduced. Welding fluxes are also sometimes used to improve the character of the deposited metal where electrodes of special composition are used. The ordinary flux covered electrode is expensive, dirty to handle, and difficult to run through automatic arc welding machines, for the reason that the flux coating acts as an insulator and makes it difficult to conduct the welding current into the electrode. The electrodes for automatic machines should be made in long lengths which, for convenience in handling, must be wound upon reels. Flux covered electrodes cannot, however, be bent without cracking or flaking off parts of the coating composition.

An object of my invention is to enable flux covered electrode welding to be as readily performed with automatic arc welding machines as plain electrode welding is now performed. A further object of my invention is to provide an arc welding machine having means for applying the flux coating to an electrode during the process of feeding such an electrode to the work.

A further object of my invention is to provide a novel method of arc welding.

My invention will be better understood from the following description taken in connection with the accompanying drawing, and its scope will be pointed out in the appended claims.

The accompanying drawing shows diagrammatically a portion of a welding machine and a vertical section of the apparatus I provide for holding the coating material and for applying the material to the electrode as it is being fed to the arc.

Since the construction and operation of automatic arc welding machines are well known I have shown only as much of a welding machine as I deem necessary for a clear understanding of my invention. One type of arc welding machine is more clearly shown and described in my copending application, Serial No. 323,170, filed Sept. 11, 1919, and assigned to the same assignee as this application.

Referring to the accompanying drawing, the welding electrode 1 shown in this case as a round wire is fed to a welding arc playing between the electrode 1 and the work 2 which may consist, for example, of two pieces to be welded together along their edges. The work 2 may be suitably mounted upon a table 3 so that the edges to be welded are in proximity. Relative motion between the work and the electrode in the direction of the seam to be welded may be produced in any suitable manner, suitable means being also provided for moving the electrode 1 forward as it melts at a rate to maintain the arc at a substantially constant length. The means indicated for moving the electrode comprises two guiding and feeding rolls 4 and 5 continuously driven by suitable means, the speed of which is varied in accordance with changes in the arc length.

The work 2 and the welding electrode 1 are connected respectively by the conductors 6 and 7 to a source of current (not shown) having a suitable characteristic for welding. The means indicated for connecting the conductor 7 to the electrode 1 comprising a brush 8 which directly engages the feed roller 4 which is in firm contact with the electrode 1.

According to my invention I apply the flux coating to the electrode while the electrode is being fed to the work, and in such a way that this coating becomes dried or baked onto the electrode. In order to accomplish this result I provide means for applying the coating to the electrode comprising a hollow tank 9 containing the material to be applied to the electrode and one or more rotatable brushes arranged to dip into the coating material in the tank and paint the same onto the electrode as it is fed through the tank. The coating material is supplied to the tank in any suitable manner, such, for example, as by means of a pipe 20, and preferably the amount of coating material supplied to the tank is controlled in any suitable manner so that the level of the material in the tank remains substantially constant. In the particular arrangement shown in the drawing two rotatable brushes 10 and 11 are provided to apply the covering material to the electrode 1. As indicated the tank comprises a cylinder 12 with a central tubular portion 13 extending up from the base and through which the electrode 1 passes. This tubular portion 13 is made of sufficient height to prevent the coating material from overflowing or running down the electrode. Also the upper end of the tubular portion is preferably made conical in shape and with the opening, through which the electrode 1 passes, a little larger than the electrode with the desired thickness of coating material applied thereto so that, if for any reason such as variations in the condition of the coating material, too much material is applied to any part of the electrode, this surplus material is scraped off and flows back into the bottom of the tank.

The coating compound in the tank 9 may be in either a liquid or pasty condition and may be composed of any desired material having an arc sustaining or flux action so long as it is of such a nature and consistency as will cause it to adhere to the electrode 1 when rubbed against the electrode by the brushes 10 and 11. The brushes 10 and 11 are preferably arranged to be driven simultaneously with the feed rollers 4 and 5 in any suitable manner and so that they rub against electrode 1 in the opposite direction to that in which the electrode is moving thereby preventing the coating material which is applied to the electrode from being rubbed off by the brushes. In the arrangement shown, the brush 10 is driven by a chain 14 and the sprocket wheels 15 and 16 which are respectively connected to the same shafts as the roller 5 and the brush 10; and the brush 11 is driven by a chain 17 and the sprocket wheels 18 and 19 which are respectively connected to the same shafts as the feeder roller 4 and the brush 11.

The brushes 10 and 11 are preferably arranged to rub against the electrode at a point between the arc and the point where the fusing current is supplied to the electrode so that the feed rollers do not interfere with the application of the coating. The heat produced by the current flowing through the electrode and the heat of the arc raise the projecting portion of the electrode to a high temperature and subject the coating material to a drying action so that the coating is dried or baked onto the electrode.

While I have shown and described one particular embodiment of my invention, various modifications and variations will be obvious to one skilled in the art, and I desire to cover all such modifications and variations as fall within the scope of my invention which is set forth in the appended claims.

What I claim as new and desire to secure by Letters Patent of the United States, is:—

1. In an arc welding machine employing a fusible electrode, the combination with means adapted to feed the electrode to the work to be welded, and means for conducting a fusing current to the electrode, of means for applying a coating or covering of liquid material to the electrode as the latter is fed to the work to be welded.

2. In an arc welding machine employing a fusible electrode, the combination with means adapted to feed the electrode to the work to be welded, and means for conducting a fusing current to the electrode, of a tank adapted to contain a liquid material, and means for applying a coating or covering of said material to the electrode as the latter is fed to the work to be welded.

3. In an arc welding machine employing a fusible electrode, the combination with means adapted to feed the electrode to the work to be welded, and means for conducting a fusing current to the electrode, of a tank adapted to contain covering compound, a rotatable brush arranged to apply said compound to said electrode, and means for rotating said brush.

4. In an arc welding machine employing a fusible electrode, the combination with means adapted to feed the electrode to the work to be welded, and means for conducting a fusing current to the electrode, of a tank adapted to contain covering compound, and a brush driven by said feeding means arranged to apply said compound to said electrode.

5. In an arc welding machine employing a fusible electrode, the combination with means adapted to feed the electrode to the work to be welded, and means for conducting a fusing current to the electrode, of a tank adapted to contain covering compound, a plurality of brushes arranged when rotated to apply said compound to said electrode, and means connecting said feeding means and said brushes so that said brushes and feeding means are operated simultaneously.

6. The method of arc welding which comprises supplying an electric current to the work by means of a fusible electrode, feeding the electrode to the work to maintain the welding arc, and applying a coating or covering of liquid material to the electrode during the feeding movement thereof.

7. In an arc welding machine employing a fusible electrode, the combination with means adapted to feed the electrode to the work to be welded, and means for conducting a fusing current to the electrode, of means for applying a coating or covering of liquid material to the electrode at a point between the arc and the point where the fusing current is connected to the electrode as the latter is fed to the work to be welded.

8. The method of coating a fusible electrode, which is supplied with fusing current, as it is fed to the work to be welded, which consists in applying a covering or coating of liquid material to the electrode at a point between the arc and the point where the fusing current is connected to the electrode.

9. In an arc welding machine employing a fusible electrode, the combination with means adapted to feed the electrode to the work to be welded and means for conducting a fusing current to the electrode, of a tank adapted to contain covering compound and having a tubular portion extending up from the base and through which the electrode passes, said tubular portion being of sufficient height to prevent the covering compound from running down the electrode, and means for applying a coating or covering of said material to the electrode as the latter is fed to the work to be welded.

10. In an arc welding machine employing a fusible electrode, the combination with means adapted to feed the electrode to the work to be welded, and means for conducting a fusing current to the electrode, of a tank adapted to contain covering compound, a rotatable brush arranged to apply said compound to said electrode, and means for rotating said brush so that it rubs against said electrode in the opposite direction to that in which the electrode is moved.

11. In an arc welding machine employing a fusible electrode, the combination with means adapted to feed the electrode to the work to be welded, and means for conducting a fusing current to the electrode, of a tank adapted to contain covering compound, a plurality of brushes arranged to apply said compound to said electrode, and means for rotating said brushes so that they rub against said electrode in the opposite direction to that in which the electrode is moved.

In witness whereof, I have hereunto set my hand this 18th day of December, 1920.

PAUL O. NOBLE.